(12) United States Patent
Marlow et al.

(10) Patent No.: US 10,528,623 B2
(45) Date of Patent: Jan. 7, 2020

(54) SYSTEMS AND METHODS FOR CONTENT CURATION IN VIDEO BASED COMMUNICATIONS

(71) Applicant: FUJI XEROX CO., LTD., Tokyo (JP)

(72) Inventors: Jennifer Marlow, Palo Alto, CA (US); Laurent Denoue, Veneto (IT); Matthew L. Cooper, San Francisco, CA (US); Scott Carter, Menlo Park, CA (US); Daniel Avrahami, Mountain View, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/619,347

(22) Filed: Jun. 9, 2017

(65) Prior Publication Data

US 2018/0359530 A1    Dec. 13, 2018

(51) Int. Cl.
| | |
|---|---|
| G06F 16/78 | (2019.01) |
| H04N 21/439 | (2011.01) |
| H04N 21/262 | (2011.01) |
| G06F 16/33 | (2019.01) |
| G11B 27/02 | (2006.01) |
| H04N 21/233 | (2011.01) |
| H04N 21/234 | (2011.01) |
| H04N 21/2665 | (2011.01) |

(Continued)

(52) U.S. Cl.
CPC ........ *G06F 16/7867* (2019.01); *G06F 16/334* (2019.01); *G11B 27/02* (2013.01); *G11B 27/031* (2013.01); *H04N 21/233* (2013.01); *H04N 21/23418* (2013.01); *H04N 21/2665* (2013.01); *H04N 21/26258* (2013.01); *H04N 21/4394* (2013.01); *H04N 21/44008* (2013.01); *H04N 21/8456* (2013.01); *H04N 21/8549* (2013.01)

(58) Field of Classification Search
CPC ......... H04N 21/4667; H04N 21/26258; H04N 21/432; H04N 21/4394; H04N 21/44218; G06F 17/30675; G06F 17/3082
See application file for complete search history.

(56) References Cited

U.S. PATENT DOCUMENTS

| | | | |
|---|---|---|---|
| 6,028,601 A | 2/2000 | Machiraju et al. | |
| 8,463,648 B1 * | 6/2013 | Bierner | G06Q 30/02 705/14.44 |

(Continued)

OTHER PUBLICATIONS

Blei, D. M., et al., Latent Dirichlet Allocation, Journal of Machine Learning Research, 2003, 3, pp. 993-1022.

(Continued)

*Primary Examiner* — Nasser M Goodarzi
*Assistant Examiner* — Adil Ocak
(74) *Attorney, Agent, or Firm* — Procopio, Cory, Hargreaves & Savitch LLP

(57) ABSTRACT

Example implementations are directed to methods and systems for curating messages from viewers to identify a question associated with a recorded video that include video data, where the question is extracted from a queue of the video data; analyze the video data to determine one or more answer segments for the question that satisfy a confidence score based on a location of the question in the recorded video; and generate an answer summary for the question with links to each of the one or more segments, where the links are ranked based on the confidence score.

20 Claims, 12 Drawing Sheets

(51) Int. Cl.
*H04N 21/44* (2011.01)
*H04N 21/845* (2011.01)
*H04N 21/8549* (2011.01)
*G11B 27/031* (2006.01)

(56) References Cited

U.S. PATENT DOCUMENTS

| | | | |
|---|---|---|---|
| 9,084,096 B2 | 7/2015 | Shamma et al. | |
| 2006/0253274 A1* | 11/2006 | Miller | G06F 17/278 704/9 |
| 2008/0137558 A1* | 6/2008 | Baird | H04L 12/1831 370/260 |
| 2008/0270344 A1* | 10/2008 | Yurick | G06F 17/30026 |
| 2014/0123014 A1* | 5/2014 | Keen | H04L 51/046 715/719 |
| 2014/0161416 A1* | 6/2014 | Chou | H04N 5/91 386/241 |
| 2014/0173642 A1* | 6/2014 | Vinson | G06Q 50/01 725/9 |
| 2017/0229030 A1* | 8/2017 | Aguayo, Jr. | G09B 7/02 |

OTHER PUBLICATIONS

Cao, J., et al., Automated Question Answering From Lecture Videos: NLP vs. Pattern Matching, Proceedings of the 38th Hawaii International Conference on System Sciences, 2005, pp. 1-8.

Cataldi, M., et al., Emerging Topic Detection on Twitter Based on Temporal and Social Terms Evaluation, MDMKDD'10 Proceedings of the Tenth International Workshop on Multimedia Data Mining, Article 4, Jul. 25, 2010, Washington D.C., 10 pgs.

Chuang, J., et al., "Without the Clutter of Unimportant Words": Descriptive Keyphrases for Text Visualization, ACM Transactions on Computer-Human Interaction, 19(3), Article 19, Oct. 2012, 29 pgs.

Fuller, M. Y., et al., Using the Periscope Live Video-Streaming Application for Global Pathology Education, Arch Pathol Lab Med, 140, Nov. 2016, pp. 1273-1280.

Hamilton, W. A., et al., Streaming on Twitch: Fostering Participatory Communities of Play within Live Mixed Media, CH'14 Proceedings of the SIGCHI Conference on Human Factors in Computing Systems, Apr. 26-May 1, 2014, Toronto, Ontario, Canada, pp. 1315-1324.

Haubold, A., et al., Augmented Segmentation and Visualization for Presentation Videos, Multimedia '05 Proceedings of the 13th Annual ACM International Conference on Multimedia, Singapore, Nov. 6-11, 2005, pp. 51-60.

Jurafsky, D., et al., Speech and Language Processing: An Introduction to Natural Language Processing, Computational Linguistics, and Speech Recognition, Pearson Educational International, 2nd Edition, 2000, 14 pgs.

Lavrenko, V., et al., Relevance Models for Topic Detection and Tracking, Proceedings of HLT 2002, Second International Conference on Human Language Technology Research, San Francisco, CA, 2002, pp. 115-121.

Li, G., et al., Video Conference: Question Answering on YouTube, MM'09 Proceedings of the 17th ACM International Conference on Multimedia, Oct. 19-24, 2009, Beijing, China, pp. 773-776.

Pan, R., et al., TwitchViz: A Visualization Tool for Twitch Chatrooms, CHI EA '16 Proceedings of the 2016 CHI Conference Extended Abstracts on Human Factors in Computing Systems, May 7-12, 2016, San Jose, CA, pp. 1959-1965.

Pavel, A., et al., Video Digests: A Browsable, Skimmable Format for Informational Lecture Videos, UIST '14 Proceedings of the 27th Annual ACM Symposium on User Interface Software and Technology, Honolulu, Hawaii, Oct. 5-8, 2014, pp. 573-582.

Ramesh, A., et al., Understanding MOOC Discussion Forums Using Seeded LDA, Proceedings of the Ninth Workshop on Innovation Use of NLP for Building Education Applications, Jun. 26, 2014, Baltimary, MD, pp. 28-33.

Repp, S., et al., Question Answering from Lecture Videos Based on Automatically-Generated Learning Objects, ICWL 08 Proceedings of the 7th International Conference on Advances in the Web Based Learning, Aug. 20-22, 2008, Jinhua, China, pp. 509-520.

Tang, J. C., et al., Meerkat and Periscope: I Stream, You Stream, Apps Stream for Live Streams, CHI'16 Proceedings of the 2016 CHI Conference on Human Factors in Computing Systems, May 7-12, 2016, San Jose, CA, pp. 470-4780.

Wang, K., et al., Exploiting Salient Patterns for Question Detection and Question Retrieval in Community-Based Question Answering, COLING '10 Proceedings of the 23rd International Conference on Compuatational Linguistics, Aug. 23-27, 2010, Beijing, China, pp. 1155-1163.

Manning, C. D., et al., Introduction to Information Retrieval, Chapter 6, Cambridge University Press, New York, NY, 2008, 26 pgs.

Hou, J.-L., et al., An Automatic Question Answering and Knowledge Summarization Approach for Q & A Services, Journal of Chinese Institute of Engineers, 32(2), Mar. 2009, pp. 193-213.

YouTube Super Chat, YouTube.com, [online] [retrieved Jun. 9, 2017] 3 pgs, URL: https://support.google.com/youtube/answer/7277005?hl=en.

\* cited by examiner

SYSTEMS AND METHODS FOR CONTENT CURATION IN VIDEO BASED COMMUNICATIONS

BACKGROUND

Field

The present disclosure is generally directed to video based communications, and more specifically, to systems and methods for curating content from video based communications.

Related Art

Live video streaming, or sharing a video live with a remote audience, is gaining in popularity and can be used for many purposes ranging from entertainment to medical education. Typically, a presenter broadcasts a video stream to large remote audiences. For example, a massive open online course (MOOC) is an online course aimed at unlimited participation and open access via the Internet that may include audience interaction. As an example, a live video streaming MOOC session may include a chat window for the audience to submit questions with a video feed and an audio feed of the presenter to provide answers. In yet another example, a celebrity may use live video streaming to conduct a virtual meet and greet with fans and respond to messages from across the globe.

In the related art, dedicated tools for live video streaming allow the remote audience to communicate with the presenter, for example, by sending text messages, sharing emoticons (or 'reactions'), responding to polling surveys, or purchasing virtual gifts for delivery to the presenter. Audience interactions during a live video stream create a barrage of communications. Related art studies have shown that presenters generally attempt to actively respond to the incoming messages, but they may miss messages that quickly disappear from an interface if a large number of messages are submitted in short time interval or may dismiss a message if the message topic is not relevant to the presenter's current train of thought. Studies have also found that presenters face greater difficulty (e.g., interrupting the event, dead air, etc.) in responding to audience communications during presentation of a structured topic (e.g., professional or educational presentations) as compared to open format events (e.g., office hours, ask me anything, town halls, etc.). Related art live video streaming tools contribute to increases in delayed response times and unanswered questions by the presenter. It can be difficult for the presenter to consume information from the communications and identify relevant messages that contribute to the discussion.

Further, recordings of video streams that contain answers to questions are difficult to navigate due to delays between the time at which a question is submitted in a chat window and the time the presenter provides a response during the video. If a viewer replaying the recorded video of a MOOC session is searching for discussion of a specific topic or an answer to a question, the viewer generally replays the entire video to monitor questions submitted in the chat and actively listen for a period of time to discover if the presenter addressed the question.

Accordingly, tools are needed to improve user engagement and interaction with video to permit participation in large-group settings while improving audience attention with sustained activity on live streaming platforms and recorded videos.

SUMMARY

Example implementations described herein provide systems and methods for receiving messages from viewers during a video session with a presenter; analyzing each message to identify a content topic and message type; detecting one or more trending topics of the messages; and generating a presenter interface with a message queue for the messages and a trending topic visualization. The presenter interface can adaptively curate the messages in the message queue based on labeling and message type. For example, the method can use natural language processing (NLP) and/or pattern recognition techniques to categorize messages as questions, greetings, statements, confirmations, etc. An example aspect of the present disclosure includes using pattern analysis and machine-learning to generate topic models from the video feed, audio, and/or message queue during live video streaming sessions. In an example implementation, the method can track the presenter's attention or interactions with the message queue to adjust the queue and promote relevant messages.

A non-transitory computer readable medium, comprising instructions that when executed by a processor, the instructions analyze messages during a video session to adapt the presenter interface with relevant messages is also provided by the example implementations.

According to another example implementations, as described herein, systems and methods are provided for identifying a question associated with a recorded video, where the recorded video comprises video data; analyzing, by a processor, the video data to determine one or more answer segments for the question that satisfy a confidence score; and generating an answer summary for the question with links to the one or more segments, where the links are ranked in view of the confidence score.

A non-transitory computer readable medium, comprising instructions that when executed by a processor, the instructions identify a question associated with a recorded video, analyze video data to determine one or more answer segments for the question that satisfy a confidence score, and generate an answer summary for the question with links to the one or more segments, where the links are ranked in view of the confidence score is also provided by the example implementations.

Other features and advantages of the present concept will become more readily apparent to those of ordinary skill in the art after reviewing the following detailed description and accompanying drawings.

BRIEF DESCRIPTION OF THE DRAWINGS

The structure and operation of the example implementations will be understood from a review of the following detailed description and the accompanying drawings in which like reference numerals refer to like parts and in which.

DETAILED DESCRIPTION

Figure 1:
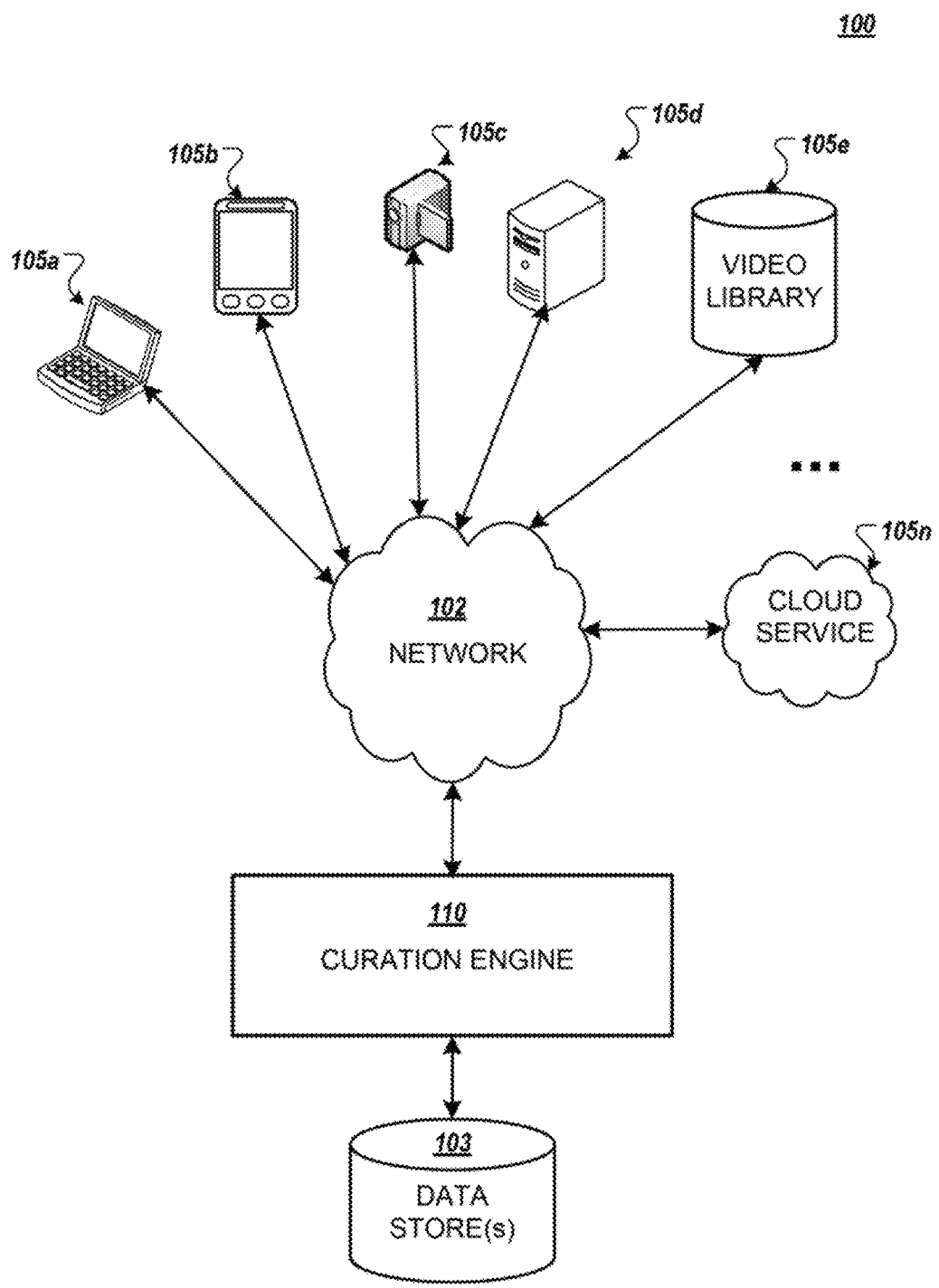
FIG. 1 illustrates an overview of a system in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

The exponential growth of digital content is creating new hurdles for people to be able to efficiently locate and consume relevant information. Video communications generally improves the consumption rate of information but is challenged by poor navigation tools as compared to searchable text. Video communications permits a presenter to deliver content to large audiences. However, presenters can be overwhelmed by the volume of messages received from the large audience, such as during an educational presentation in a Massive Open Online Courses (MOOC). Accordingly, tools are needed that allow presenters to interact with large audiences during real-time video conferences. Moreover, tools are need for locating answers to questions in recorded video communications, such as a MOOC lecture.

An example aspect of the present disclosure relates to tools for curating questions in video based communications. Content curation is the process of sorting through large amounts of content to present meaningful and accessible selections of content based a specific theme or topic. As described herein, content curation involves analyzing data to identify a context, determining correlations between groupings of content, and annotating the content for efficient retrieval and/or customized presentation. The curated content may permit efficient access to content that is relevant to address a need or question that is otherwise inaccessible during a live video streaming session or recorded video archive.

In an example implementation, a presenter is provided tools that may more efficiently acknowledge a greater volume of user communications with more complex topics during a live video stream. According to an example implementation, incoming messages are analyzed for keywords and topics, classified into different types of comments and grouped for presentation to the presenter. The tools include a variety of visualization techniques to assist the presenter consumption of the information from the messages in real time.

The video session of a presentation can be moderated or hosted by a presenter (e.g., a user that initiates the live streaming session). The user that initiates the video session is generally referred to as the 'presenter' that is the recipient of chat messages and reactions from viewers. Video session of a presentation refer to a period of time when the presenter is sharing (e.g., transmitting) a video stream with an audience and the audience reacts or interacts through chat messages, payments, gifts, emoticons, etc.

A live streaming session may or may not be archived for asynchronous viewing. Aspects of the present disclosure are directed to providing curated messages to a presenter to effectively respond to the audience without having to provide their full attention to a message queue. Example implementations include a curation method that automatically manages content and receives input from the audience to make content more visible to the presenter. Implementations include interfaces that allow the presenter to dismiss or save content and viewers to relay segments of content associated with messages from the queue. For example, the curation method can detect and assign categories to each message received via the chat interface, such as Questions, Hello's, Statements, Confirmations, Requests, Unknown, etc., and adjust the presenter's interface or link a video segment using at least the categories.

According to an example implementation, messages submitted during a live video stream are managed according to topic models. An interface for a presenter or host includes tools to effectively manage messages from the group of views based on the speed, volume, and content of topics. In an example, the presenter interface includes a presenter dashboard with topic emoticon visualizations, a dynamic messaging queue, activity overlays (e.g., map), etc. For example, during a live streaming session with a group, the tool generates a presenter interface that may permit real-time interaction with the group to maximize the presenter's responsiveness to trending topics. The presenter interface may improve viewer engagement and responsiveness during live video streaming sessions.

According to another example implementation, topics from a recorded video are managed according to topic models with playback navigation for asynchronous viewing. Viewer tools are provided to effectively locate relevant portions of recorded video that address a question and/or topic. Recorded video is analyzed and links are generated to access video segments based on the content's relevancy to a question in view of a confidence score. In an example implementation, the recorded video analysis includes locating questions in a message history from the recorded video and analyzing the video feed and/or audio feed to identify segments that include relevant responses from the presenter. The identified segments undergo further processing to develop an ordered list (e.g., ranking) based on a confidence score. The confidence score is weight according to context factors such as tracking the presenter's attention to the message queue interface during the recording.

For example, after a question appears in the message queue, the video feed may indicate that the presenter reviewed the question. Later, the audio feed of the presenter may repeat keywords or phrases from the question that indicate the segment is relevant to answering the question from the queue. The process can generate links between the questions and determined video segments. Based on machine-learning and viewer feedback, relevant video segments can be summarized for questions answered during the recorded video. Therefore, viewers may quickly and easily identify questions addressed in the recorded video and quick retrieve the relevant video segment that addresses the question without reviewing the video recording from the beginning.

According to an example implementation, a viewer interface can include a question summary that links questions to a ranked series of video segments. For example, after a professor records a MOOC session, the tool generates a recorded viewer interface that allows asynchronous interaction with the recorded video. The viewer interface allows users to input questions that are searched against a library of recorded videos. Curation of questions addressed in recorded videos may permit efficient interaction with recorded content that improves view engagement and comprehension.

FIG. 1 illustrates an overview of a system 100 in accordance with an example implementation. The system 100 includes a curation engine 110 configured to analyze video content via a network 102 or from a video library 105e. The curation engine 110 can analyze a video stream from one or more devices 105a-105n and provide a customized interfaces with curated content. The curation engine 110 may be implemented in the form of software (e.g., instructions on a non-transitory computer readable medium) running on one or more processing devices, such as the one or more devices 105a-105d, as a cloud service 105n, remotely via a network 102, or other configuration known to one of ordinary skill in the art.

The terms "computer", "computer platform", processing device, and device are intended to include any data processing device, such as a desktop computer, a laptop computer, a tablet computer, a mainframe computer, a server, a handheld device, a digital signal processor (DSP), an embedded processor, or any other device able to process data. The computer/computer platform is configured to include one or more microprocessors communicatively connected to one or more non-transitory computer-readable media and one or more networks.

The curation engine 110 directly or indirectly includes memory such as data store(s) 103 (e.g., RAM, ROM, and/or internal storage, magnetic, optical, solid state storage, and/or organic), any of which can be coupled on a communication mechanism (or bus) for communicating information.

In an example implementation, the curation engine 110 can be hosted by a cloud service 105n and communicatively connected via the network 102 to devices 105a-105n in order to send and receive data. The term "communicatively connected" is intended to include any type of connection, wired or wireless, in which data may be communicated. The term "communicatively connected" is intended to include, but not limited to, a connection between devices and/or programs within a single computer or between devices and/or separate computers over the network 102. The term "network" is intended to include, but not limited to, packet-switched networks such as local area network (LAN), wide area network (WAN), TCP/IP, (the Internet), and can use various means of transmission, such as, but not limited to, WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

Devices 105a-105n can include, for example, mobile computing devices 105a-105b (e.g., smart phones, laptops, tablets, etc.), presentation systems 105c, computing devices 105d (e.g., desktops, mainframes, network equipment, etc.), multimedia libraries 105e, as well as cloud services 105n (e.g., remotely available proprietary or public computing resources). Devices 105a-105n can access video streaming services with functionality, for example, to collect, transmit, and/or store video data and message data. For example, a mobile computing device 105a can include a camera and access a live video streaming service 105n to present a live video stream to viewers on other devices 105a, 105b, 105c, 105d, 105n via the network 102.

Devices 105a-105n may also collect information (e.g., message data, feedback data, etc.) from one or more other device 105a-105n and provide the collected information to the curation engine 110. For example, devices 105a-105n can be communicatively connected to the other device using WiFi®, Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

The curation engine 110 curates video information during live streaming video, as well as, playback of recoded video sessions. In example implementations, the curation engine 110 accesses the video streaming session (e.g., via a device 105a-105d, or cloud service 105n) or recorded video session (e.g., video library 105e), process the video data according to one or more algorithms as described herein, and provides access to curated message data. In an implementation, the curated message data for a video streaming session is provided via a presenter interface, as described in reference to FIGS. 2-6. In an implementation, the curated message data for recorded video session is provided via meeting summary or viewer interface, as described in reference to FIGS. 2 and 6-9.

Figure 2:
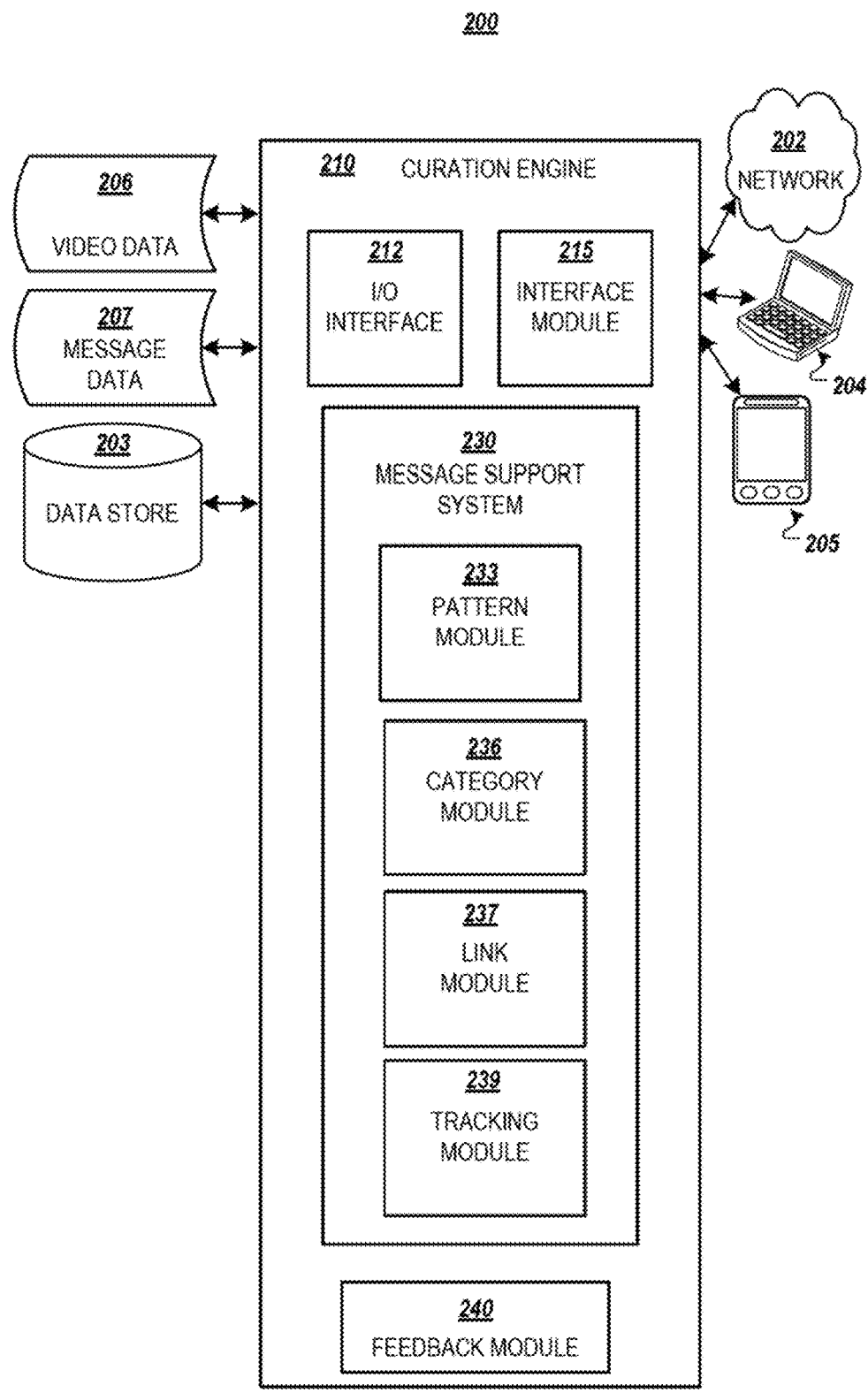
FIG. 2 illustrates an example curation engine in accordance with an example implementation.

FIG. 2 illustrates an example system 200 including a curation engine 210 in accordance with an example implementation. The curation engine 210 includes one or more I/O interfaces 212, an interface module 215, a message support system 230, and a feedback module 240. The curation engine 210 is coupled to one or more data stores 203 for storing data (e.g., information, models, feedback, video files, etc.). The curation engine 210 can discern patterns in messages to categorize messages into different types and develop topic model to group and score different messages. A video session may be processed to build a custom topic model.

In an example implementation, the I/O interface 212 includes one or more communication interfaces communicatively connected with a network 202 or different types of devices 204, 205 (e.g., devices 105a-105n of FIG. 1.) The I/O interface 212 can receive video data 206 from different sources, such as a data store 203, different types of devices 204, 205, or via a network 202. Further, the I/O interface 212 can receive message data 207 from different sources, such as a data store 203, different types of devices 204, 205, or via a network 202. In an example implementation, the I/O interface 212 can receive a live stream of video data 206 and message data 207 via the network 202.

In another implementation, the I/O interface 212 can receive a recorded stream of video data 206 from the data store 203 and message data 207 via the network 202. In another implementation, the I/O interface 212 can receive video data 206 including a transcription of a video session and message data 207 from one or more devices 204, 2015. That is, the curation engine 210 can receive, via the I/O interface 212, video data 206 and message data 207 from a variety of sources in different formats and provide an interface, via the interface module 215, to various end devices or cloud services. The combinations listed here are illustrative examples, and other combinations as would be understood by those skilled in the art may be substituted therefore.

For example, video data 206 can include a transcript of the audio from a live or recorded video. Video data 206 can also be analyzed to extract visual information, such as presenter's focus of interaction during a video segment. Message data 207 includes messages submitted from the audience in text or video based forms. Message data submitted in the form of video can also be processed to transcribe an audio feed of the video message. Message data can also include supplemental information about the sender, such as, location, demographics, etc. Video data 206 and message data 207 can be received by the curation engine 210 in real-time or retrieved from data store 203.

The curation engine 210 can interact with a live streaming video sessions and stored video sessions to output curated messages. The message support system (MSS) 230 can include a topic module 233, a category module 236, a link module 237, and a tracking module 239 that interact with the I/O interface 212, interface module 215, and feedback module 240. In an example implementation, the message support system 230 includes an analysis process to learn topic patterns, identify context specific keywords, and track a presenter's attention from the video data 206 and message data 207.

According to an example implementation, the MSS 230 analyzes a message to categorize the type of message. For example, the MSS 230 can classify a message as a greeting, questions, confirmation, gratitude, etc. For example, multiple methods for question detection can be employed that utilize lexical pattern and syntactic pattern analysis to train a classification model for handling informalities in languages. The topic module 233 analyzes received data (e.g., video data 206 and message data 207) and creates a topic models for use by the curation engine 210. The category module 236 determines context factors from the messages using syntax analysis. In an example implementation, the category module 236 can include a set of policies to determine whether the information is useful as criteria for classifying messages.

The topic module 233 and category module 236 of MSS 230 develops rules that can include assigning a weighting factor to a message based on additional parameters through the machine-learning process. According to an example implementation, the category module 236 can use the data (video data 206, attention data from the tracking module 239, feedback from the feedback module 240) to recognize context factors to interactively determine or verify that a message is associated with a category or topic. In an example implementation, lexical and syntactic question patterns are used to detect features and build classification models. A machine-learning process is implemented to fully automate empirical evaluation of messages based on training data or dynamically updated models as described in further detail in reference to FIGS. 3-4.

The link module 237 identifies correlations between the video feed, audio fee, and messages to generate links between the formats. The link module 237 can interact with the tracking module 239 to associate a message with video data or other messages as described in further detail in reference to FIGS. 7-9.

The tracking module 239 can monitor activity associated with the presenter. In some implementations, the tracking module 239 is included in the curation engine 210, may be hosted by a device 105a-105n, and may notify the curation engine 210 of data (e.g., information) associated with the interactions of the presenter. In an example implementation, the tracking module 239 tracks the presenter's activity to identify attention to messages or visual cues at a particular time to associate information from the message queue or audio feed. The tracking module 239 can monitor data, from the video feed, to detect the presenter interacting with the message queue scanning or selecting a message. The tracking module 239 detects, from the audio feed, the presenter reading the question out loud. For example, the tracking module 239 can track the presenter's attention through eye gaze and pupil detection using cameras to identify a change in the user's level of activity. The MSS 230 can associate a location of the audio with keywords of the questions as addressing the question.

The MSS 230 analyzes messages from the video session, develops a topic model with conversation specific keywords, and labels each message with a category type and topic. In an example implementation, the MSS 230 interacts with the interface module 215 to actively manage a message queue during a live streaming video session. The MSS 230 also provides summary information about the messages for visual display via an interface or as links that associate the messages with particular time in recorded video.

The feedback module 240 is configured to provide evaluation information back to the MSS 230 for refining and improving the MSS 230 functionality. For example, the feedback module 240 can gather viewer input to identify topics or questions. The feedback module 240 can collect evaluation information from the user to adapt the assigned topics, categories, and links over time.

Figure 3:
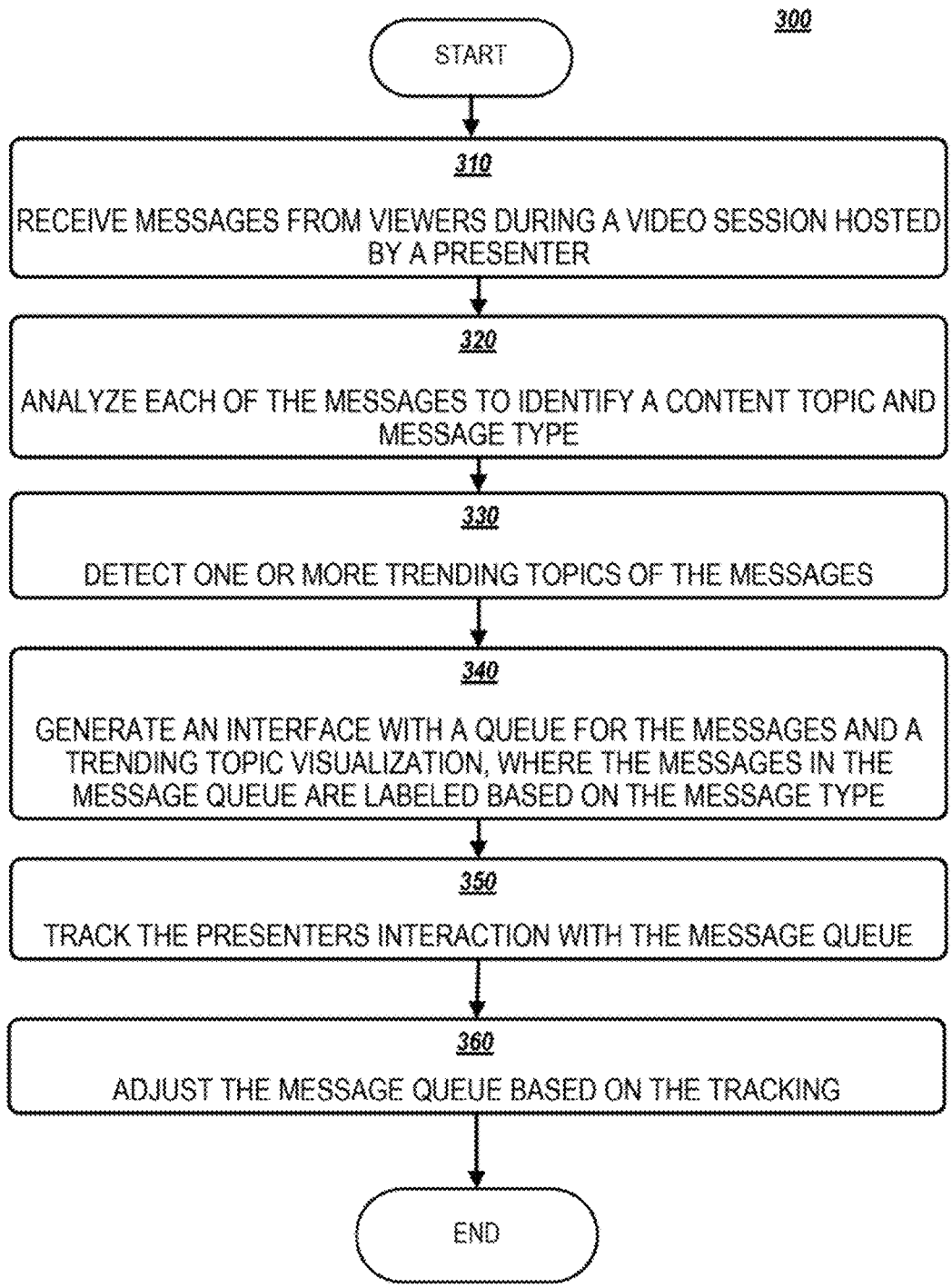
FIG. 3 illustrates a flow diagram for generating a presenter interface in accordance with an example implementation.

FIG. 3 illustrates a flow diagram 300 for generating a presenter interface in accordance with an example implementation. The process 300 is performed by processing logic that may comprise hardware (circuitry, dedicated logic, etc.), software (such as operates on a general purpose computer system or a dedicated machine), or a combination of both. Method 300 may be performed by the curation engine 110 of FIG. 1. Though method 300 is described below as being performed by the curation engine, method 300 may also be performed by other processing logic.

At block 310, the processing device receives messages from viewers during a video session hosted by a presenter. Techniques for topic detection within distributed social chat applications are employed. For example, MOOC videos may include discussion forums as a platform for exchange of ideas, course administration, discussion about course material, etc. However, unlike typical messages from discussion boards where users select a topic thread, messages from viewers of a video may not readily identify topics or subtopics that categorize the message. Messages may represent interaction between the instructor and the students and/or among the students.

At block 320, the processing device analyzes each message to identify a content topic and message type. To analyze each message, the processing device detects context keywords in the messages, generates a topic model for the video session and associates a topic from the topic model based on the content of each message. Message can be categorized into types, such as, questions, greetings, statements, confirmations, unknown, etc. The processing device uses key phrase patterns and syntax analysis to determine a message type for each of the messages.

Example implementations include statistical relational learning methods, such as, Probabilistic Soft Logic for collective, probabilistic reasoning in relational domains that uses weighted rules to model dependencies in a domain. Example implementations use computational linguistics methods to classify the content of messages for a video stream. For example, topic models are used to map conversations that occur between users and can employ topic input from a course syllabus, viewer feedback (e.g., crowd sourced moderation), as well as, detection of keywords from a transcript of the presenter to seed topic models. Topic assignments using Probabilistic Soft Logic can develop direct modeling and topic modeling.

At block 330, the processing device detects one or more trending topics of the messages. Trending topics of the messages are used to build a trending topic visualization, such as a reaction cloud, message highlighting, message grouping, or location overlays, etc. At block 340, the processing device generates a presenter interface with a message queue for the messages and a trending topic visualization, where the messages in the message queue are labeled based on the message type.

The processing device can track the interactions of the presenter with message submitted to the queue by the audience, analyze the audio feed, and then the processing device adjusts the messages in the queue based on whether a corresponding interaction or matching keyword is detected. Tracking the presenter can employ eye-gaze tracking, gesture detection, voice command, etc. In an example implementation, the processing device, tracks audio of the presenter from the video session and highlights messages with topics that correlate to content of the audio. In an example, the processing device can adapt the presenter interface to control a decay rate of a message from the queue, highlight a message in the queue, promote a message to stay in the queue, group messages in the queue, or fade a message from the queue.

Figure 4:
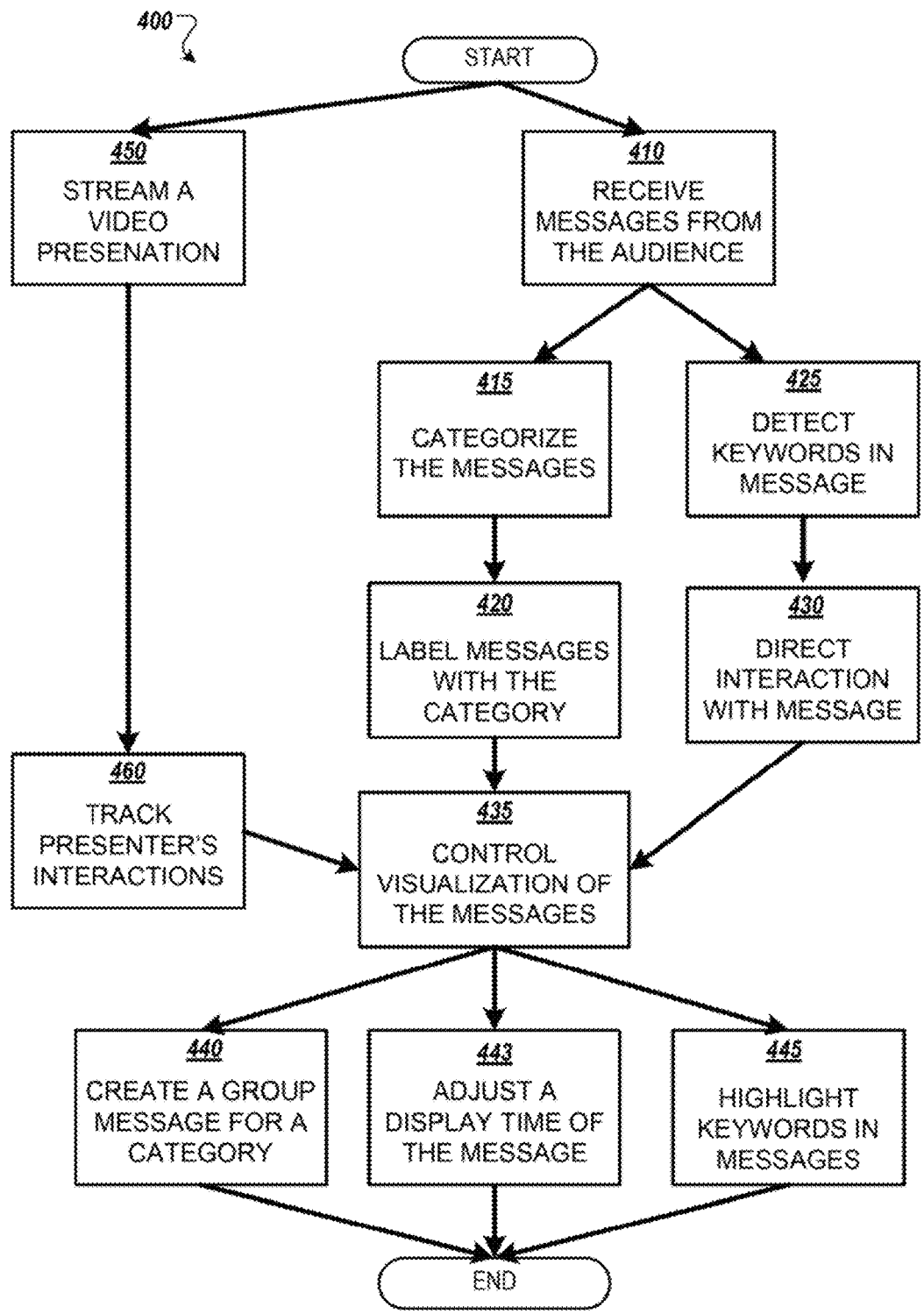
FIG. 4 illustrates a flow diagram for curating messages during a live presentation in accordance with an example implementation.

FIG. 4 illustrates a flow diagram 400 for curating messages during a live presentation in accordance with an example implementation. At block 450, the system receives a video stream for a presentation. The video stream of a presentation can be moderated or hosted by a presenter that initiates the video session and receives chat messages and reactions from viewers. During the a period of time when the presenter is sharing (e.g., transmitting) a video stream with an audience and the audience reacts or interacts through chat messages, payments, gifts, emoticons, etc. The data from the video stream and messages are analyzed to providing curated messages to a presenter in a managed interface for effectively responding to the audience without having to provide their full attention to a message queue.

At block 460, the system tracks presenter's interactions with an interface. A tracking system (e.g., tracking module 239 of FIG. 2) monitors a presenter's attention to portions of the interface. The presenter's attention can be used to adjust control or presentation of the messaging on the interface. In an example implementation, attention tracking can be monitored via head tracking, eye-tracking, etc. The presenter interacts with the interface using a variety of inputs to minimize distractions during the presentation. For example, the presenter can use a handheld remote, gesture recognition, eye-movement commands, etc. to interact (e.g., select, highlight, dismiss, archive, etc.) with the messages and/or topics.

According to an example implementation, the system records the content of the presenter's audio channel for voice recognition and content analysis. For example, the presenter's audio channel can be transcribed into text during the recording. A transcription of the presenter's audio can be processed via the message support system to analyze the content, develop a topic model, and assign categories to portions of the transcription. The categorized portions of the audio transcription are associated with time anchors in the video thereby creating a topic trend of the video while the presentation is still in progress.

The topics and/or categories associated with the recently analyzed presenter audio can be used by the message support system. For example, a current topic and/or category can be detected to highlight messages from viewers that correspond to the current topic and/or category. The messaging support system can use the presenter's topic and/or category data as weighted input for pattern detection and categorization of the audience's messaging stream. According to another example implementation, the audio transcription of the presenter is used to generate a video summary with links to different topics and/or answers to questions as described in further detail below.

At block 410, the system receives messages from the audience. At block 415, the system categorizes the messages. At block 420, the system labels messages with the category. According to an example implementation, the engine analyzes a message to categorize the type of message. For example, the engine can classify a message as a greeting, questions, confirmation, gratitude, etc. For example, lexical pattern and syntactic pattern analysis can be employed for question detection that train a classification model for handling informalities in languages.

At block 425, the system detects keywords in the messages. In an implementation, lexical and syntactic question patterns are used to detect features and build classification models. A mining and leaning process can be fully automated that requires no human intervention to provide empirical evaluation of messages based on training data or dynamically updated models. The process extracts a set of salient patterns from messages to detect features associated with a category. For example, pattern of messages are detected (e.g., who, what, where, why, how keywords, sentence structure, question marks, etc.) to identify features associated with questions.

The system uses lexical patterning to categorize messages. For example, the system performs lexical analysis on the message to convert a sequence of characters or keywords into a tokens with an assigned category. Examples of sequential pattern analysis can include identification of comparative sentences, the detection of erroneous sentences, and question sentences, Examples of syntactic patterns can include syntactic shallow patterns, mined sequential tokens, pattern length, mined token frequency, token distance, part of speech tags, context score, confidence score, etc. as discussed in further detail herein. Example implementation can include analysis of possible sub-tree structures or portioning of the parsing tree for pattern extraction and representation with sequential learning algorithm (e.g., Conditional Random Fields (CRF), Support Vector Machines (SVM), etc.). For example, the process categorizes the message based on a positive and/or negative pattern analysis.

Other methods for detecting the category of a text snippet can be based on generic natural language processing. Additional categories, specific to a streaming session, can be incrementally generated, e.g., using a topic model. For example, latent Dirichlet allocation can be used to generate statistical model for sets of observations to be explained by unobserved groups to associate parts of the data that are similar. Inference learning (e.g., Bayesian inference, Gibbs sampling, and expectation propagation) is used to determine the distributions of a set of topics, associated word probabilities, the topic of each word, a particular topic mixture of each message or session, etc.

Context relevant terms (e.g., important or unique words) in each message are also detected and included in the pattern analysis. According to an example implementation, unique terms are flagged relative to a corpus, or incrementally relative to messages in a streaming video session. For example, the process can include term frequency—inverse document frequency vector space modeling and advanced key phrase detection methods based on NLP. Relevance rankings of keywords in the messages associated with the video can be calculated, for example, by comparing a deviation of angles between each vector and an original query vector where the query is represented as the same kind of vector as the video.

At block 430, the system directs interaction with the message. At block 435, the system controls visualization of the messages. At block 440, the system can create a group message for multiple messages that share a common category. For example, multiple messages that are categorized as greeting messages (e.g., hi, hello, good morning, etc.) can be grouped into a single message that communicates the sentiment of the category. For example, the system can filter greeting messages received during an interval from the message queue and combine the filtered messages into a single message.

Grouping, messages from certain categories reduces the volume of messages in the queue as diminishes distractions to the presenter. When a meeting starts, all greetings received in the first few minutes can be withheld from being displayed in the message queue and presented as a group message with a generalized greeting and supplemental information (e.g., usernames, user locations, message submission timestamp, etc.)

At block 443, the system can adjust a display time of the message. In an example implementation, the system can increase a rate of the decay for a message to fade from the message queue quicker and decrease a rate of decay for another message to keep the other message on the screen longer. At block 445, the system can highlight keywords in the message.

Figure 5A:
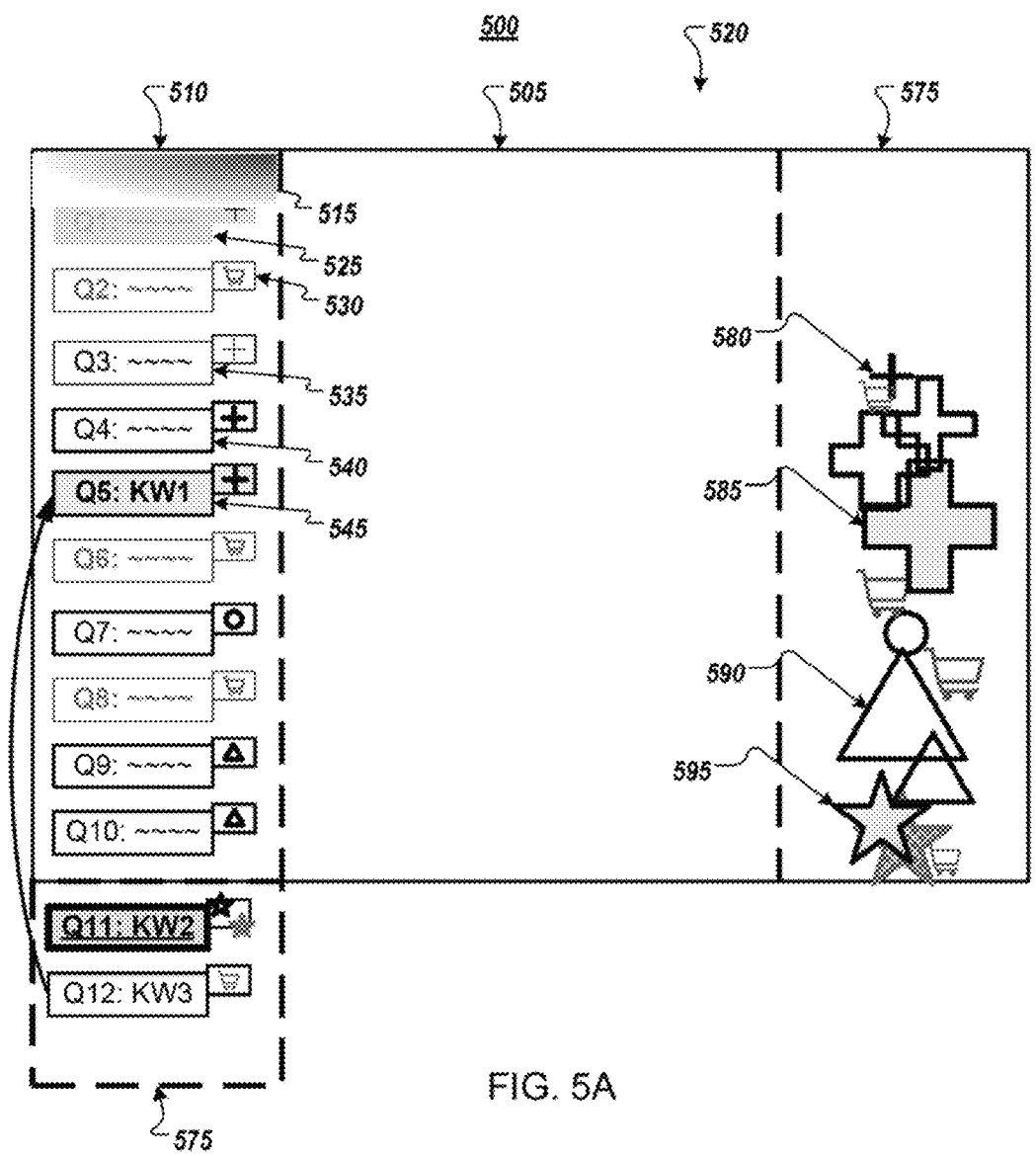
FIGS. 5A-C illustrate an example presenter interface in accordance with example implementations.
Figure 5B:
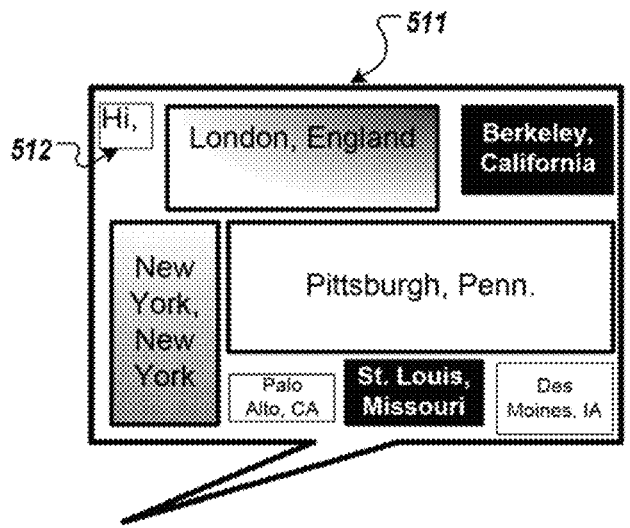
Figure 5C:
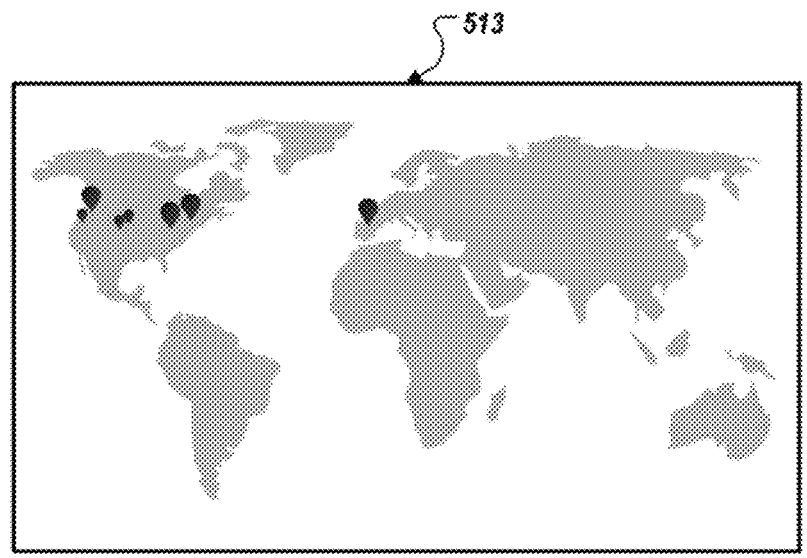

FIGS. 5A-C illustrate an example presenter interface in accordance with example implementations. FIG. 5A illustrates an example presenter interface 500 in accordance with an example implementation. The presenter interface 500 includes a message queue 510, a video viewer 505, and/or a trending topic visualization 575. The presenter interface 500 can dynamically control messages submitted to adjust the appearance in the message queue. The message queue 510 adaptively displays messages in the queue according to text analysis of the message and activity tracking of the presenter. In an example implementation, the message queue 510 can be a linear listing of messages that are managed and visually adjusted according to the curation process described in reference to FIGS. 2-4.

Each message is analyzed and assigned a category. Common categories can be visualized using a category label (e.g., an icon, emojis, colors, symbols, fonts, etc.) to quickly communicate the type of message to the presenter before the presenter takes the time to read and process the contents of the message. For example, a category icon 530 for a shopping cart can be appended to the message Q2. Message categories can be used to adjust the visualization of the message, as well as, track message activity during the video session. For example, message categories are used to group or combine messages, vary the frequency or time that messages from the category are displayed, track questions asked during the video session, etc.

The trending topic visualization 575 can use the category labels (e.g., icons, symbols, emoticons, etc.) to communicate to the presenter popular categories or topics being discussed in the messages. For example, the trending topic visualization 575 can show a stream of category icons (e.g., to indicate the volume). The trending topic visualization 575 shows the audience's reaction to the presenter in real-time.

For example, if the presenter says something confusing to the audience, the trending topic visualization 575 may indicate (e.g., quickly) that a volume of questions (e.g., questions icon as a +) has increased or surged in response. The trending topic visualization 575 can adjust manipulate the icon + to be more prevalent when there is a surge or growing volume. For example, the message queue 510 can fade out message at 515 based on the message's age relative to other messages. As new messages are displayed, older messages can be faded out from the queue or roll off the top of the queue as the volume of messages cross a threshold.

In an example, message Q1 at 525 can transition out of view in the message queue 510 after a certain time or a number of messages are presented. The presenter interface 500 includes means for tracking the presenter and providing control of the interface. For example, the presenter can actively dismiss a question with a hand gesture or eye movement.

In an example, the message queue 510 can highlight messages or de-emphasize messages based on the presenter's level of attention to the category. For example, if the presenter actively dismisses messages categorized as requests (e.g., labeled with a shopping cart icon), the message queue 510 and the trending topic visualization 575 can deemphasize the messages in that category (e.g., Q2, Q6, Q8, etc.).

The message queue 510 can highlight messages (e.g., Q5 545) based on analysis of the message or the video data. For example, the message Q5 in the queue may be highlight in response to a keyword in the message matching a keyword in the audio feed of the video session. Keyword detection in the audio stream can also be used to reintroduce messages that were filtered or removed from the message queue 510. For example, if the presenter is discussion KW1, message Q5 can be highlighted, KW3 can identified directly associated with KW1, and message Q12 containing KW3 can be promoted to display next to message Q5. Thus, the presenter's attention is directed to messages related to the audio stream and as the presenter interacts with a message, related messages are identified and arranged for efficient interaction between the presenter and the audience.

FIG. 5B depicts an example group message 511 for the presenter interface 500 in accordance with an example implementation. Grouping messages from certain categories reduces the volume of messages in the queue and diminishes distractions to the presenter. The interface can create a group message for multiple messages that share a common category. For example, group message 511 can display in the message queue 510 when multiple messages greeting messages (e.g., hi, hello, good morning, etc.) are received during an interval. The message queue 510 can withhold the greeting messages from appearing, identify a keyword or phrase 512 for the messages, gather supplemental information about the users, and present the group message 511. The presenter can be provided with a summary of information to quickly review. For example, the group message 511 shows the locations of the viewers and indicates the sized of the audience in each location that submitted a greeting message. The presenter is able to effectively interact with large audience, for example, calling out a popular segment of the audience that is engaged.

FIG. 5C depicts an example message tracker 513 for the presenter interface 500 in accordance with an example implementation. The presenter interface 500 can also include a message tracker 513 to communicate the volume of messages coming from a particular location. The message tracker 513 can be displayed as part of the trending topic visualization 575, as a pop-up window, other add-on, etc. In an example message tracker 513, the presenter interface 500 summarizes information about the audience graphically laid out on a map of the world. The presenter interface can include various other graphical visualizations to summarize audience information or messaging.

Figure 6A:
FIGS. 6A-B illustrate example presenter interfaces in accordance with example implementations.
Figure 6B:
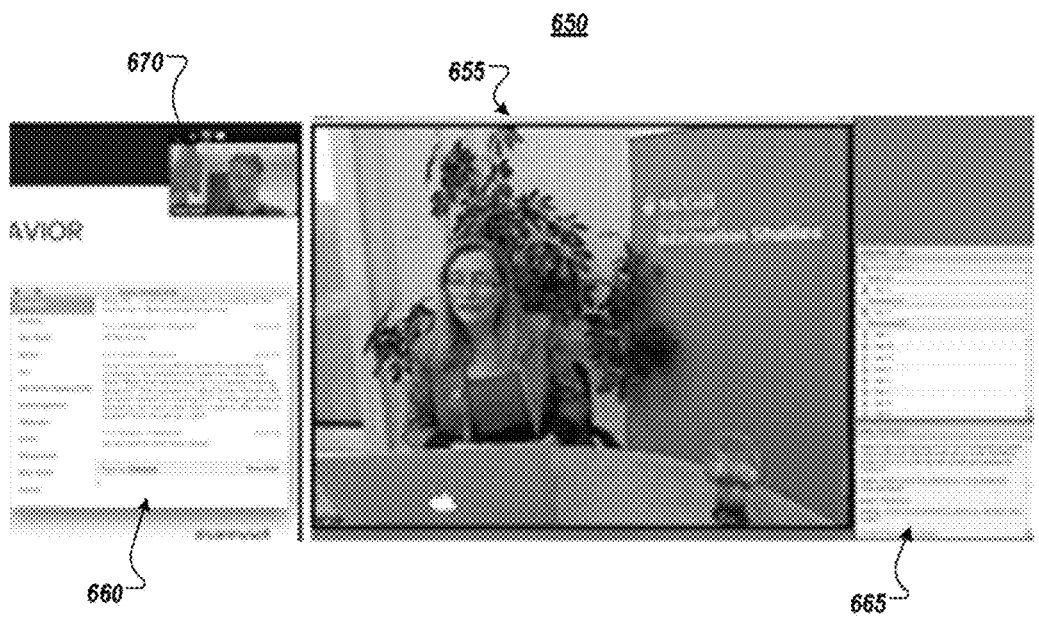

FIGS. 6A-B illustrate example presenter interface 600 in accordance with example implementations. FIG. 6A illustrates example presenter interface 600 in accordance with example implementations. In the example presenter interface 600, the message queue 610 is depicted with category labels as balloons next to each message. The trending topic visualization 615 includes groupings of colored hearts to indicate trending topics of the messages. A video viewer section 605 the presenter interface 600 shows the presenter the video feed being streamed to the audience.

FIG. 6B illustrates an example video communication platforms that feature streaming video and a messaging interface on the side for audience interaction. The main means of participation for viewers is to type comments or questions into the text chat interface. At various times, the meeting leader (e.g., presenter) may notice or acknowledge a question. Generally, the presenter may first repeat or reading off the question as typed by the attendee, and then proceed with the answer via the audio feed. There is often a delay between the time at which the question is submitted via the chat interface and the response is given in video.

Figure 7:
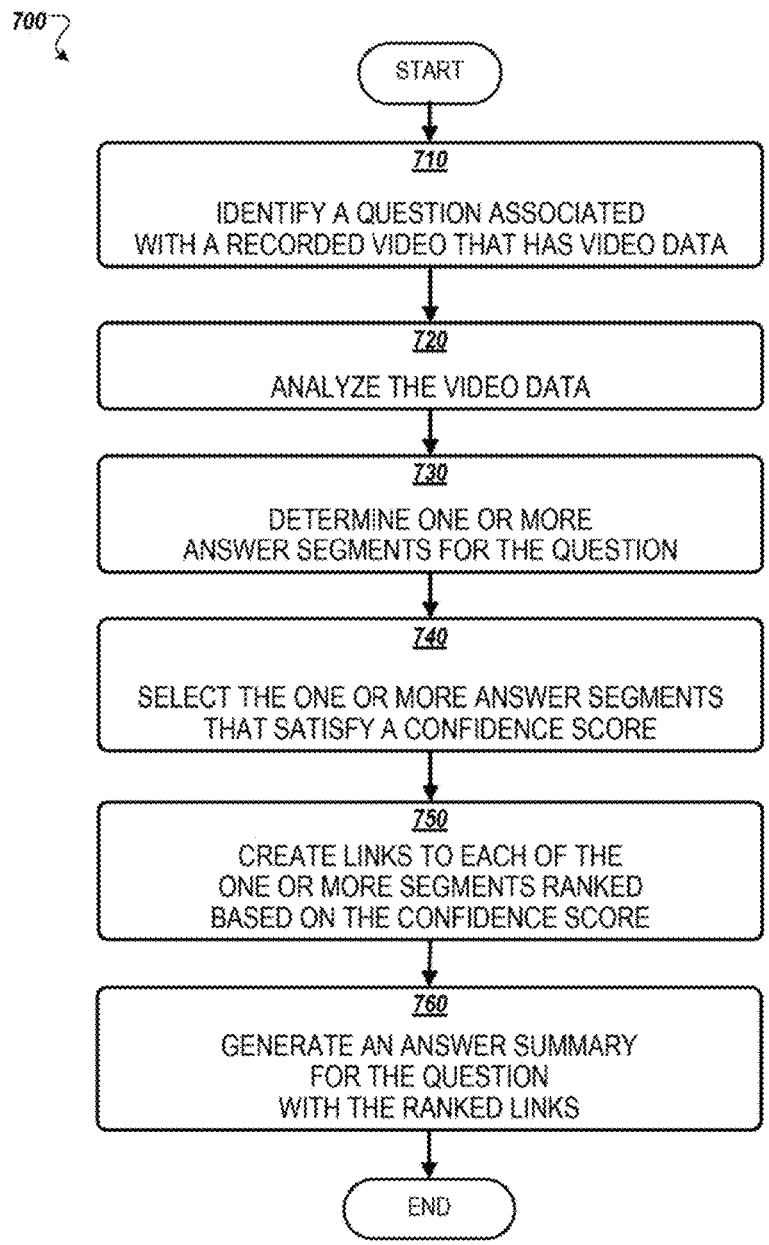
FIG. 7 illustrates a flow diagram for curating answers from a recorded video session in accordance with an example implementation.
Figure 8:
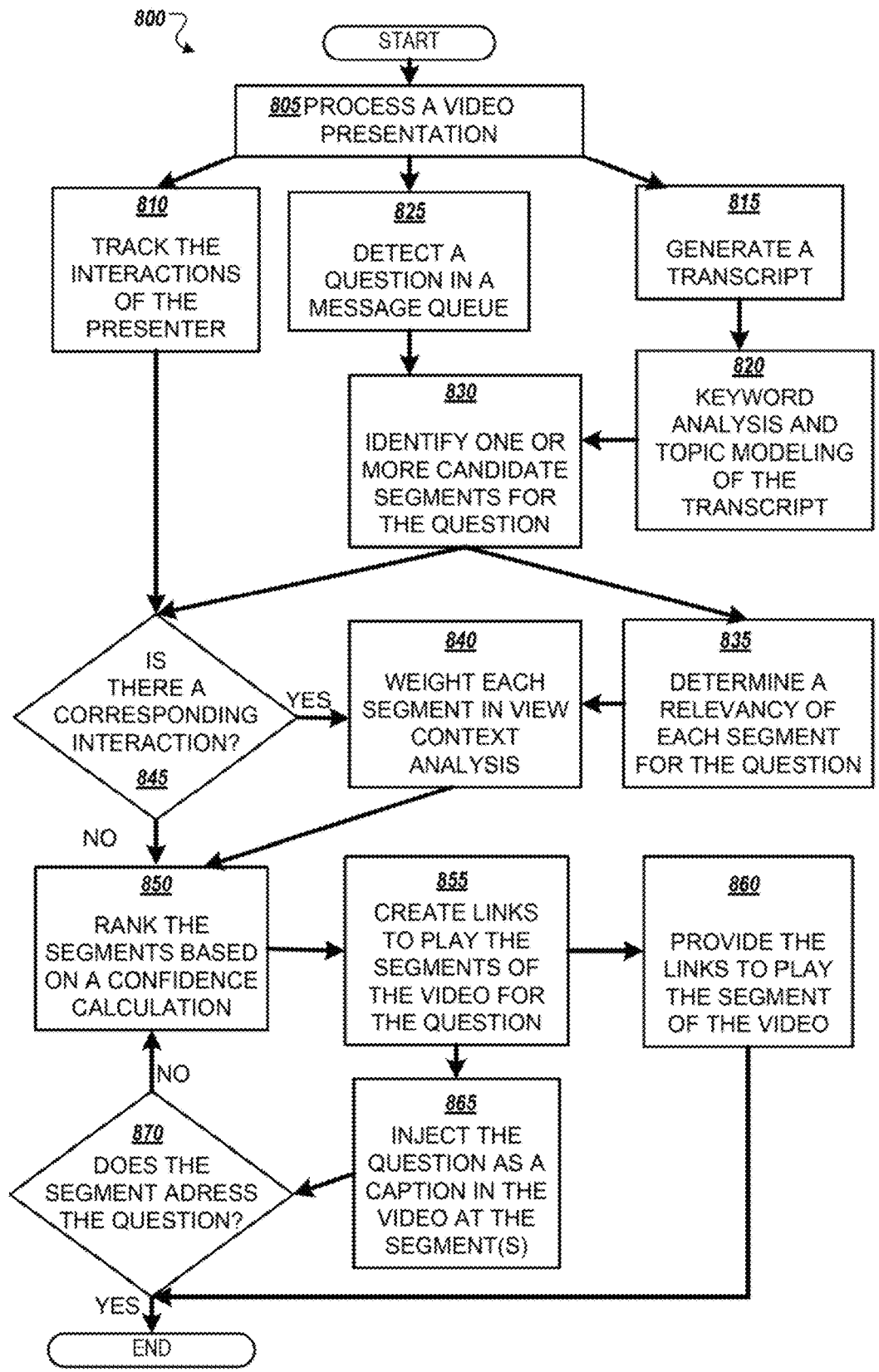
FIG. 8 illustrates a flow diagram for curating answers from a recorded video session in accordance with an example implementation.

As discussed in reference to FIGS. 7-9, viewers' experience with recorded presentations is improved by providing meeting summaries that link segments of the video together with questions from web-based meetings. The meeting summaries are stored and can be recalled or searched against to present relevant portions of information for easy review by viewers watching the meeting after it has ended.

FIG. 7 illustrates a flow diagram 700 for curating answers from a recorded video session in accordance with an example implementation. The process 700 is performed by processing logic that may comprise hardware (circuitry, dedicated logic, etc.), software (such as operates on a general purpose computer system or a dedicated machine), or a combination of both. Method 700 may be performed by the curation engine 110 of FIG. 1. Though process 700 is described below as being performed by the curation engine, method 700 may also be performed by other processing logic.

Method 700 relates to creating summaries of recorded video through multimodal linking of questions to segments of the video and/or audio that may address the question. For example, method 700 can identify and summarize time-distributed questions from a large video-mediated presentation or meeting with links to segments (e.g., starting time or location) of the recorded video that address the question. For example, in large presentations (online classes, webinars, etc.) where viewers ask questions in a text chat interface, a presenter may or may not immediately address the question from the chat queue. It is thus difficult and time consuming to find questions and their associated answers for people watching a recorded version of the meeting.

In an example implementation, the process 700 detects questions being asked in chat/text format, identifies when the speaker uses the same or similar words in the audio file, indicating the presenter is reviewing the question, and translates the audio that follows into text. The process 700 creates an easily reviewable and navigable summary of associated questions and answers with a given presentation for future viewers. The navigable summary allows the viewer to save time by skimming or querying the topics discussed (e.g., detected questions) in the video to locate a segment of the video that is relevant to the question.

At block 710, the processing device identifies a question associated with a recorded video, wherein the recorded video comprises video data. In an example implementation, the question associated with a recorded video is extracted from a message queue of the video data. For example, a chat history from the recorded video can be parsed for syntax that indicates the messages that have a question message type.

At block 720, the processing device analyzes the video data. Analyzing the video data includes detecting keywords in audio content of the video data. In an example implementation, analyzing the video data includes tracking a presenter's interaction with the message queue and adjusting the confidence score based on the tracking. For example, if the video content indicates the presenter was reviewing or interacting with a chat portion of a presenter interface, the processing device can increase the confidence score that a later video segment may address the questions in the chat portion. In example implementations, tracking the interactions of the presenter with the chat portion (i.e., message queue) uses eye-gaze tracking, screen activity analysis, gesture detection, or audio synchronization.

In some implementations, the analysis of the video data can add supplemental information to the audio transcript. For example, when the processing device identifies a pronoun in the transcription, a preceding topic in the transcription and/or one or more messages from a message log can be associated with the pronoun to improve the likelihood of identifying content relevant to a question.

At block 730, the processing device determines one or more answer segments for the question. In an example implementation, the processing device can determining a time of the question in the recorded video and search the video data that occurs after the time of the question to identify segments with relevant word sequencing to the question. Since the questions being evaluated are generated by viewers of the presentation (e.g., messages submitted during the original presentation), the submission time of the question can be used as an initial searching point for addressing the question.

To determines which of the one or more segments address the question, the processing device can perform context analysis using other messages in the queue, video content, audio content, viewer feedback, or other external data that indicates a video or audio segment is relevant to the question. In example implementations, the context analysis can use a recency (e.g., time proximity) of the candidate segment to the time of the question, a recency of the candidate segment to a detected interaction by a presenter with the message queue, feedback from a viewer of the recorded video, or relevance of visual content of the candidate segment to the question.

For example, if the video content includes visual of a presentation slide (e.g., a PowerPoint slide) or the audio indicates a page number of a handout, the processing device can use the information from slide or handout in conjunction with the audio transcript of presenter to indicate a segment that addresses a question. At block 740, the processing device selects the one or more answer segments that satisfy a confidence score. For example, the processing device can calculate the confidence score for the question based on the video data associated with the question.

At block 750, the processing device creates links to the selected one or more answer segments for the question. The links include a starting time for each segment of the video. Activating the link presents the recorded video at a point in the recording associated with the question. The question may be associated with more than one link to a segment and the processing device can generate an ordered list of candidate segments based on the relevance to the question in view of the context analysis. For example, a threshold number of candidate segment can be included that are likely to address the question. In some examples, a point in the recording can be associated with more than one question.

At block 760, the processing device generates an answer summary for the question with the links ranked in view of the confidence score. When the viewer activates the link, the viewer is presented with the segment of the video without having to re-watch the video from the beginning. The link can be in the form of a text link, embedded video play list, etc.

In an implementation, the processing device can provide an interactive interface for providing playback of the recorded video at a point in response to receiving questions. In an implementation, the processing device can inject text of the question as a caption for the recorded video at a point associated with one of the ranked links. In an implementation, after the viewer accesses the segment via the link, the processing device can gather feedback (e.g., a like, a thumbs up, a rating, a user generated label, etc.) on whether the link addressed the question to adjust the ranking of links stored in the answer summary.

FIG. 8 illustrates a flow diagram for curating answers from a recorded video session in accordance with an example implementation. The process generates links between the chat message and the point in the video when keywords from the question indicate a portion of the transcript is relevant. Ordered list of candidate answer segments can be arranged according to estimated relevance to the question. At block 805, the system processes a recorded video presentation to analyze visual information, audio information, and messaging information.

At block 815, the system can generate a text transcription of the audio feed from the presentation. The transcription can include information discussed during the meeting. Methods for text-based information retrieval and natural language processing can be used to process the transcript. At block 820, the transcript is used to develop a topic model for the discussion during the meeting. Relevance rankings of keywords in the messages associated with the video can be calculated, for example, by comparing a deviation of angles between each vector and an original query vector where the query is represented as the same kind of vector as the video.

At block 825, the system reviews the message log to categorize messages, identify questions, and label messages with topics. According to an example implementation, the messages are categorized based on syntax and keyword analysis. The system can generate a keyword library associated with the meeting topics. In an example implementation, approximate word sequence matching techniques are employed to locate when a question is posed in chat interface compared to when the topic appears in the spoken transcript if the presenter reads some or all of it to provide context prior to the answer. Alternate keywords (e.g., the name of the user asking the question) can also be used to identify relevant responses to a message in the audio transcript.

At block 830, the system identifies one or more candidate segments for a question, determines a relevancy of each candidate segment for the question at block 835, and can weigh the relevance in view of context analysis for each segment at block 840. To identify one or more candidate segments for a question, the system uses keyword extraction and keyword matching to identify question answer pairs. Detecting answers refers to locating segments or starting points in the video or audio recording that address the question or a related topic. Since the presenter may first repeat or reading off the question as typed by the attendee and then proceed with the answer via the audio feed, question-answer pairs can be determined by comparing a message log from attendees to a transcription of the presenters audio.

The system can limit searching for relevant segments based on the context. For example, the search for segments that address a question can be limited to portions of the video after the time the question is first posed by a user. In an example, the video data, audio data, and message log can be synchronized or sequenced based on timestamps in each format. Automatic speech transcription of the video feed can be used with vector space retrieval to improve the search quality. Relevancy of each candidate segment for the question can be calculated from a vector space analysis.

At block 840, the system can weigh the relevance in view of context analysis for each segment. In an implementation, context analysis can include tracking of the presenter's attention from the visual information in the video feed. The system makes use of other contextual cues to improve the likelihood that the time linked to in the video correctly corresponds to the given question. For example, a presenter will likely read a question in the chat at a time t and then respond to the question at time t+x. The visual detection of the interaction with the interface displaying the message at a time prior to audio detection of keywords matching message indicates the location of the video with the keyword in the audio is relevant to addressing the question. The system employs software-based eye tracking technologies, as well as, mouse, pointer, gesture, and screen detection, to bias linked times toward those in which the lecturer was attending to the chat interface. Context relevant terms (e.g., important or unique words) in each message are also detected and included in the pattern analysis. According to an example implementation, unique terms are flagged relative to a corpus, or incrementally relative to messages in a streaming video session. For example, the process can include term frequency—inverse document frequency vector space modeling and advanced key phrase detection methods based on NLP. Relevance rankings of keywords in the messages associated with the video can be calculated, for example, by comparing a deviation of angles between each vector and an original query vector where the query is represented as the same kind of vector as the video.

In an example implementation, at block 810, the system analyzes the video feed to track the presenter's interaction during the recorded heating. At block 845, the system can determine if there is a presenter interaction that corresponds with the candidate segment. If there was no corresponding interaction indicated by the visual information, the system can proceed to rank the candidate segments based on a confidence calculation.

If yes, the system can weight the candidate segment as more relative based on the context analysis at block 840. For example, the visual information can indicate the presenter's interaction with a chat interface at a specific time in the recording that corresponds to one or more messages displayed in the chat interface. If a candidate segment for the question corresponds to a detected interaction with the chat interface that included the question at the time of the interaction, the system weights the segment as more relevant because the visual information indicates the presenter interacted with the message containing the question.

At block 850, the system ranks the candidate segments based on the confidence calculation. At block 855, the system creates links to play the segment of the video for the question. The links can be provided as part of a meeting summary in various formats. The meeting summary can include links from the text-based question to the segments of the video that address the question. For example, at block 860, the system provides links to play the segments of the video. In another example, at block 865, the system can inject the question as a caption in the video at the segment. The system can also present the video cued up to the segment for the link (e.g., time t); generate a separate question-and-answer interface; or allow the viewer to navigate via the message log to move the video playback to the time t that corresponds to the answer to the question.

At block 870, the system asks the viewer whether the segment answers the question, and the system uses the feedback at block 850 to update the rank of the segments or a confidence calculation for a segment. The system can gather feedback from viewers to iteratively improve the confidence calculation or adjust the ordered list of links for a question. For example, viewers replaying a MOOC session may indicate (e.g., vote, scale, rank) whether the provided segment is relevant to address the question. Based on the viewers' feedback, other viewers may receive an updated order list that can re-order some, or all the segments, as well as, remove a segment from the ordered list based on the viewers' feedback.

In an example implementation, block 805, blocks 810, block 815, and block 820 can be performed for each recorded video session. Blocks 825 and block 830 can be repeated for each question detected from the message queue. Blocks 835 to blocks 860 can be repeated to process a group of candidate segments for the question. According to an example implementation (not shown) blocks 830-865 can be repeated in response to a threshold of negative feedback being received at block 870.

Figure 9A:
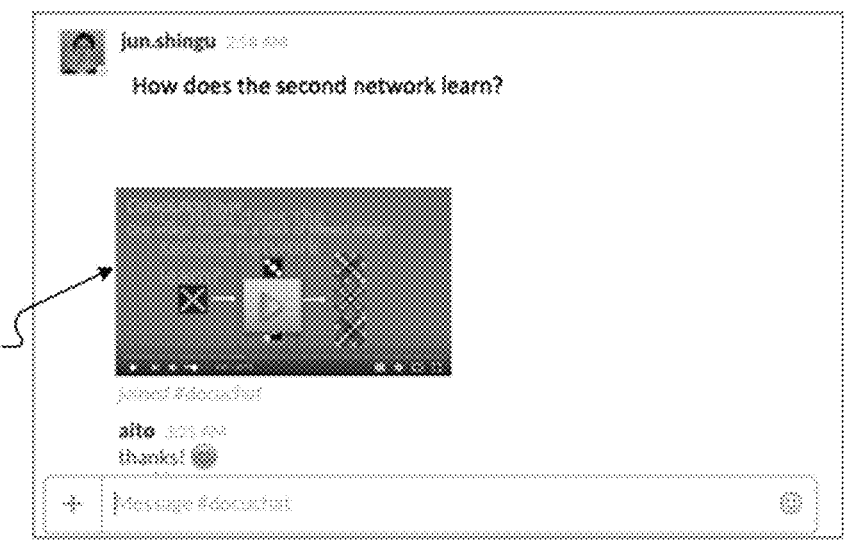
FIGS. 9A-C illustrate example depictions of viewer interfaces for accessing curated answers in accordance with example implementations.
Figure 9B:
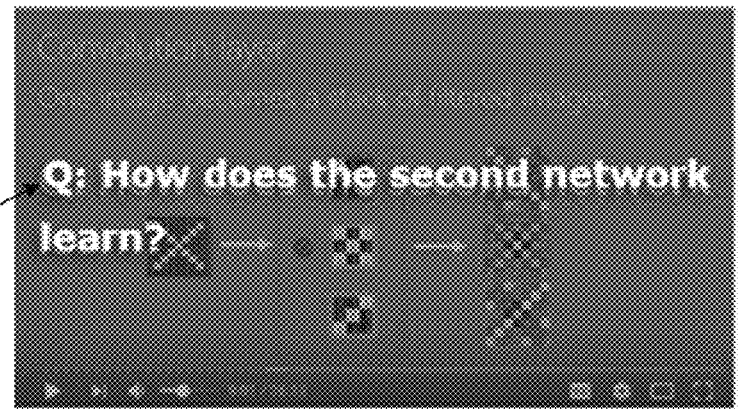
Figure 9C:
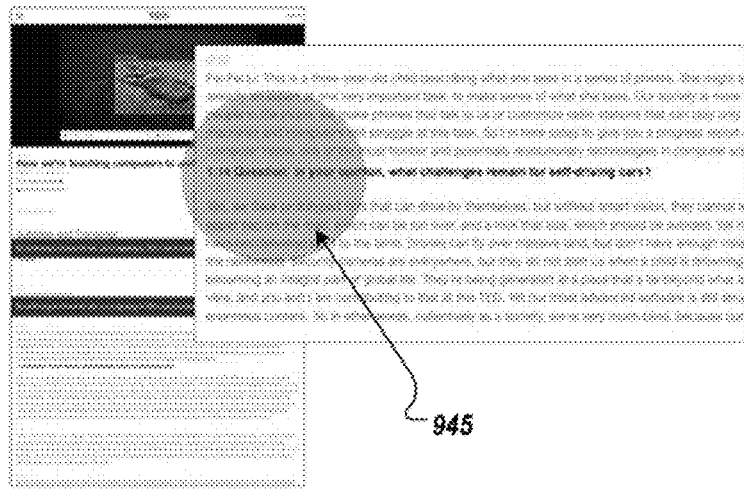

FIGS. 9A-C illustrate example depictions of viewer interfaces for accessing curated answers in accordance with example implementations. FIG. 9A depicts a message interface for a viewer to locate segments from a recorded video that addresses a questions. In an implementation, the question associated with the recorded video can be received from a viewer during playback of recorded video and the message support system can analyzing the message log from the video data to determine if one or more messages include a similar question asked during the original presentation. For example, a viewer replaying the video can submit a question about a topic (e.g., networks); the processing device can search a message log and determine if any previously identified questions are relevant to networking. As described above, the processing device can calculate a confidence score to determine the relevancy, gather viewer feedback, and conduct further search or refinement to locate a segment that addresses the question.

FIG. 9B illustrates an example video playback interface with question overlaying 925 the video. The curation engine can inject the question into the video interface as visualization, such as a graphical pop-up, text caption, visual overlay, etc. For example, the video playback interface can include captioned text within or outside the playback window. In another example, an interactive icon be injected into the video so that when a segment starts the viewer can interact to display the answer summary with the question, links to other segments in the answer summary, feedback options, etc.

In an implementation, the video playback interface can provide a series of video segments according to the ordered list of confidence for addressing the question. For example, the first segment in the order list can begin playing and start playing the next segment in the ordered list when the first segment finishes or the viewer indicates to move to the next segment. The viewer's interaction with each segment can be gathered as feedback to confirm the confidence of the segment addressing the question. For example, the amount of playback time before a viewer chooses to skip to the next segment in the ordered list can be tracked and compared to adjust the ordering of the list. For example, if the viewer watches 30 seconds of the first segment, 10 seconds of the second segment, and 35 seconds of the third segment, the feedback can indicate the second segment is less relevant than the third segment. The feedback can also track the number of times a segment is replayed compared to other segments in the list. Replaying a segment multiple times may indicate the content is highly relevant. The feedback can be used to re-arrange the ordered list to move segments earlier or later in the playlist. Feedback from multiple viewers can be combined to improve the inferences regarding the relevance or irrelevance of a video segment in the list.

The video playback interface can also include controls to view the segments from the list in sequence with the original recording. For example, the segments may be discontinuous while the content builds off of previous segment. The video playback interface can present the segment that appears the earliest in the recording indicated as addressing the question and automatically skip forward to later locations in the video indicated as relevant to the question in the meeting summary.

FIG. 9C illustrates an example transcript interface that injects questions into the transcript with a link to the video segment. For example, if the presenter addresses a question from the message queue without repeating the question, the transcript interface can include the question injected at 925 or overlayed at the point (e.g., a time or location in the video) determined as addressing the question. The injected question can include a link to launch the video segment that corresponds to the point in the audio transcript. Accordingly, the viewer can quickly navigate or discover relevant topics from the audio transcript interface, review questions submitted by attendees that are addressed be the topic in the transcript, and switch to a video replay of the segment to consume the visual and audio content displayed during the meeting.

Figure 10:
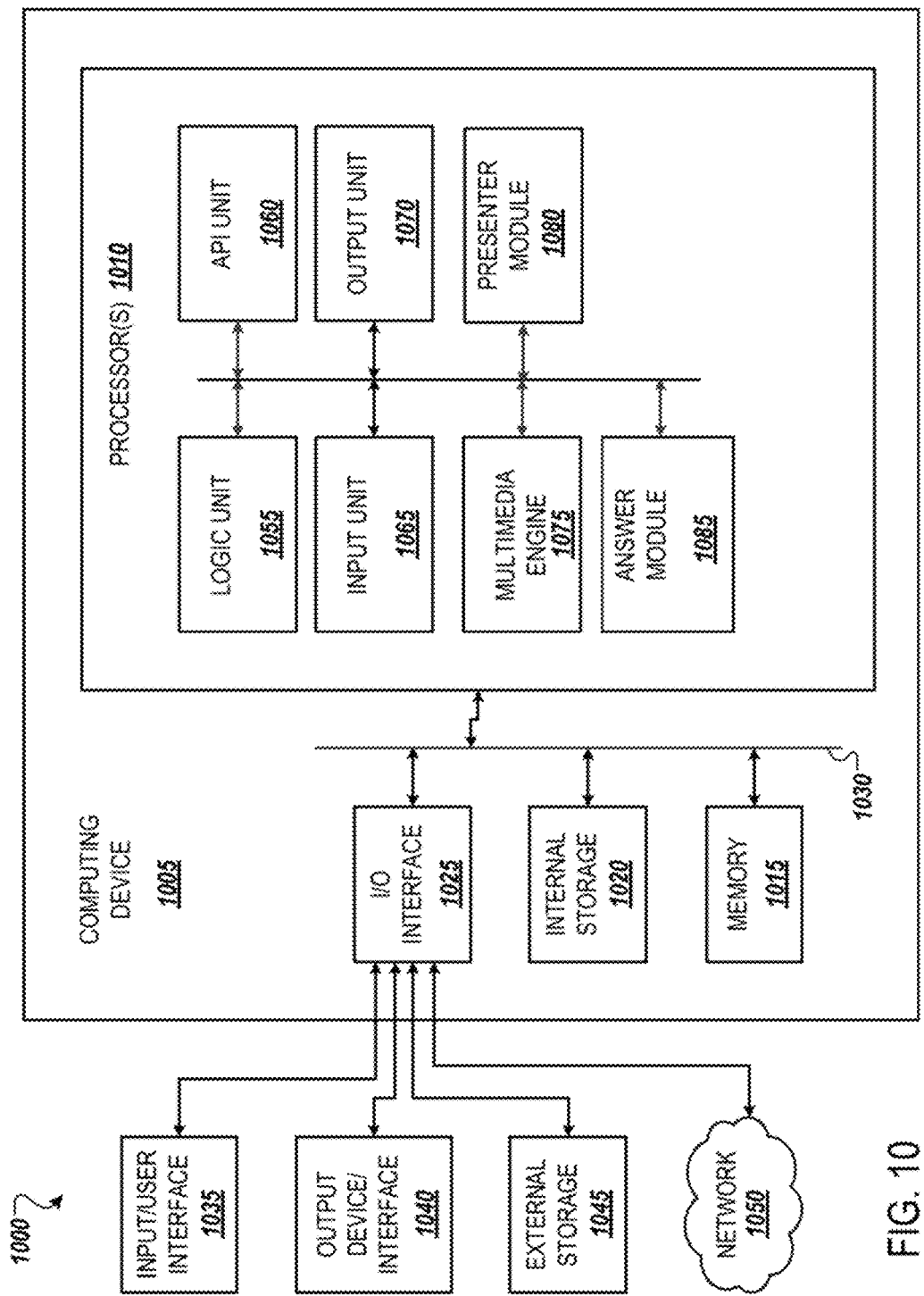
FIG. 10 illustrates an example server computing environment with an example computer device suitable for use in example implementations.

FIG. 10 illustrates an example server computing environment with an example computer device suitable for use in example implementations. Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual that can be used to provide input (e.g., buttons, touchscreen interface, keyboard, a pointing/cursor control, microphone, camera, braille, motion sensor, optical reader, and/or the like).

Output device/interface 1040 may include a display, television, monitor, printer, speaker, braille, or the like. In some example implementations, input/user interface 1035 and output device/interface 1040 can be embedded with or physically coupled to the computing device 1005. In other example implementations, other computing devices may function as or provide the functions of input/user interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or another label.

The I/O interface 1025 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1055, application programming interface (API) unit 1060, input unit 1065, output unit 1070, multimedia module 1075, presenter module 1080, and/or answer module 1085. For example, input unit 1065, multimedia module 1075, presenter module 1080, and/or answer module 1085 may implement one or more processes shown in FIGS. 2-9. The described units and elements can be varied in design, function, configuration, or implementation and are not limited to the descriptions provided.

In some example implementations, when information or an execution instruction is received by API unit 1060, it may be communicated to one or more other units (e.g., logic unit 1055, output unit 1070, input unit 1080, input unit 1065, multimedia module 1075, presenter module 1080, and/or answer module 1085 (e.g., curation engine, message support system, etc.). Input unit 1065 may, via API unit 1060, receive videos, video data, audio feeds, messages, etc. to curate, via multimedia module 1075, presenter module 1080, and/or answer module 1085, dynamic message queues with trending topic visualizations as well as answer summaries for recorded videos. Using API unit 1060, message support system 1085 can analyze the information to identify generate a presenter interface for live streaming video with a dynamic message queue with a trending topic visualization and generate an answer summary from recorded video with that links question with one or more relevant segments that address the question.

In some instances, logic unit 1055 may be configured to control the information flow among the units and direct the services provided by API unit 1060, input unit 1065, output unit 1070, input unit 1065, multimedia module 1075, presenter module 1080, and/or answer module 1085 in some example implementations described above. For example, the flow of one or more processes or implementations may be controlled by logic unit 1055 alone or in conjunction with API unit 1060.

Figure 11:
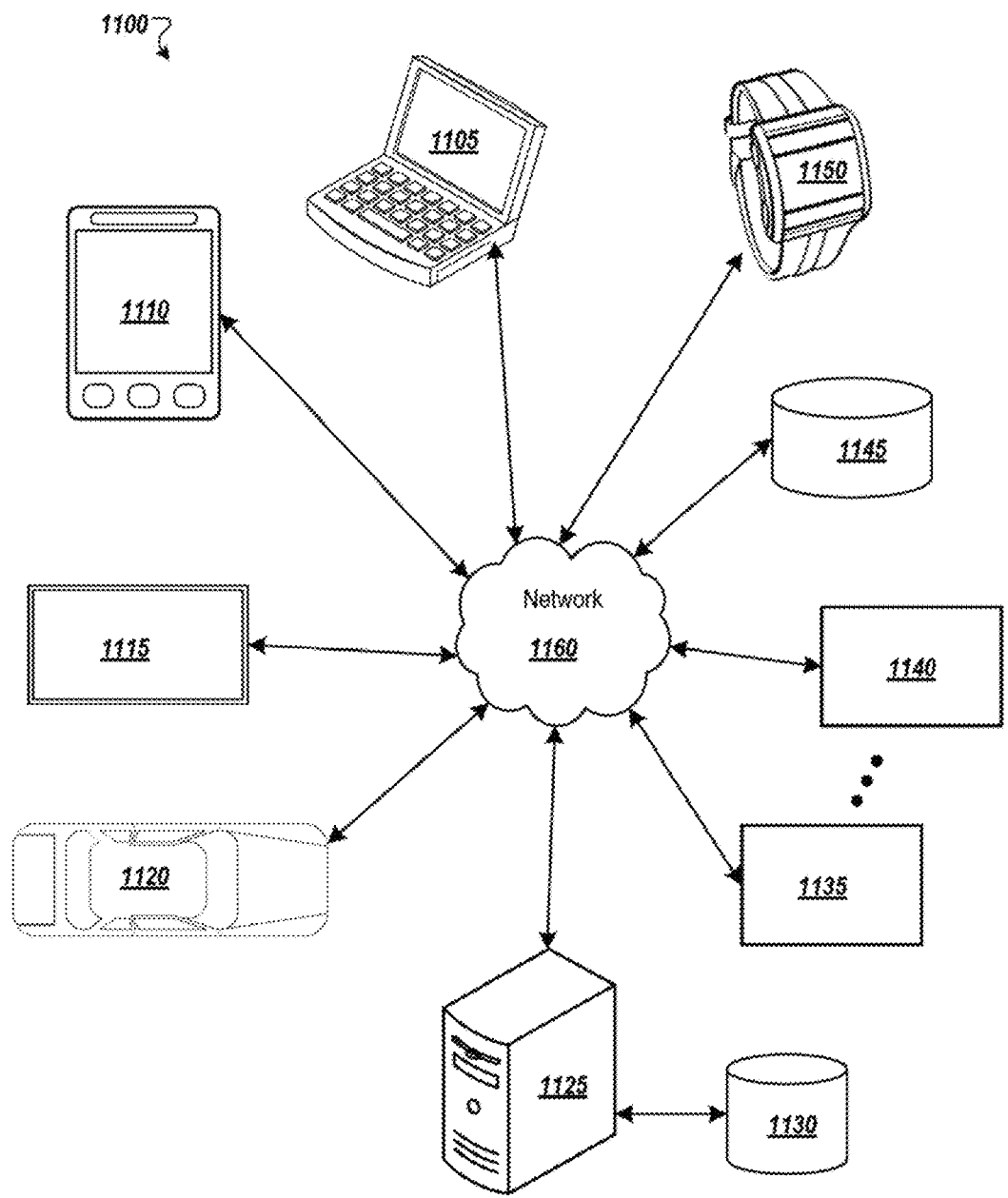
FIG. 11 illustrates an example networking environment with example computer devices suitable for use in example implementations.

FIG. 11 illustrates an example networking environment with example computer devices suitable for use in example implementations. Environment 1100 includes devices 1105-1150, and each is communicatively connected to at least one other device via, for example, network 1160 (e.g., by wired and/or wireless connections). Some devices may be communicatively connected to one or more storage devices 1130 and 1145.

An example of one or more devices 1105-1150 may be computing devices 1005 described in regards to FIG. 10, respectively. Devices 1105-1150 may include, but are not limited to, a computer 1105 (e.g., a laptop computing device) having a display and as associated webcam as explained above, a mobile device 1110 (e.g., smartphone or tablet), a television 1115, a device associated with a vehicle 1120, a server computer 1125, computing devices 1135-1140, storage devices 1130 and 1145. As explained above, the meeting environment of the user may vary, and is not limited to an office environment.

In some implementations, devices 1105-1120, 1150 may be considered user devices associated with viewers of the videos or the presenter. Devices 1125-850 may be devices associated with service (e.g., video delivery services as described above and with respect to FIGS. 1-2, and/or store data, such as video data, message data text, text portions, images, image portions, audios, audio segments, videos, video segments, and/or information thereabout).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as "receiving," "detecting," "determining," "identifying," "analyzing," generating," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method operations. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application.

Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

The example implementations may have various differences and advantages over related art. For example, but not by way of limitation, as opposed to instrumenting web pages with JavaScript as explained above with respect to the related art, text and mouse (e.g., pointing) actions may be detected and analyzed in video documents.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
   during a live streaming broadcast that is being recorded as recorded video:
      receiving, by a processor, a text-based question from a chat interface during the live streaming broadcast directed to a topic of the recorded video;
      analyzing, by the processor, video data associated with the recorded video to determine one or more video-based answer segments for the text-based question that satisfy a confidence score;
      generating an ordered list of the one or more video-based answer segments based on context analysis;
      generating an answer summary for the question, wherein the answer summary comprises links to a starting time for a threshold number of the one or more segments in the ordered list that are ranked based on the confidence score;
      injecting the text-based question into the recorded video at the one or more segments, indicated by the links, during the live stream broadcast; and
      providing the answer summary to the chat interface.

2. The method of claim 1, wherein analyzing the video data comprises detecting keywords in audio content of the video data.

3. The method of claim 1, wherein the text-based question is associated with a queue of the video data, and wherein analyzing the video data further comprises:
   tracking an interaction of a presenter with the queue; and
   adjusting the confidence score based on the interaction.

4. The method of claim 3, wherein tracking the interaction with the queue uses at least one of eye-gaze tracking, screen activity analysis, gesture detection, and audio synchronization.

5. The method of claim 1, wherein to determine one or more answer segments for the question that satisfies the confidence score comprises:
  determining a time of the question in the recorded video;
  searching the video data that occurs after the time of the question to identify segments with relevant word sequencing to the question;
  wherein generating the ordered list comprises candidate segments based on context analysis is further based on the relevant word sequencing in view of the question returning a starting time for a threshold number of candidate segment in the ordered list.

6. The method of claim 5, wherein the context analysis comprises at least one of:
  a time proximity of the candidate segment to the time of the question;
  a time proximity of the candidate segment to a detected interaction by a presenter with the queue of the video data;
  feedback from a viewer of the recorded video; and
  relevance of visual content of the candidate segment to the question.

7. The method of claim 1, wherein the video data is a transcription of audio content or visual content from the recorded video.

8. The method of claim 7, further comprising:
  identifying a pronoun in the transcription; and
  associating the pronoun with a preceding topic in the transcription or a message from a message log using context analysis.

9. The method of claim 1, further comprising performing syntax parsing to extract the question from the chat interface.

10. The method of claim 1, wherein the text-based question is received from a viewer during playback of recorded video, and the method further comprises:
  analyzing a message log from the video data to determine one or more messages that satisfy a message confidence score; and
  calculating the confidence score for the question based on the video data associated with the determined messages.

11. The method of claim 1, further comprising presenting the recorded video at a point associated with one of the ranked links.

12. The method of claim 1, further comprising injecting text of the question as a caption for the recorded video at a location associated with one of the ranked links.

13. The method of claim 1, further comprising an interactive interface configured to playback of the recorded video at a point in response to receiving questions.

14. The method of claim 1, further comprising adjusting the ranking of links based on feedback from the viewer.

15. A system comprising:
  a memory;
  a processor operatively coupled to the memory, the processor configured to:
  during a live streaming broadcast that is being recorded as recorded video:
    receive, by a processor, a text-based question from a chat interface during the live streaming broadcast directed to a topic of the recorded video;
    analyze video data associated with the recorded video to determine one or more video-based answer segments for the text-based question that satisfy a confidence score;
    generate an ordered list of the one or more video-based answer segments based on context analysis;
    during the live streaming broadcast, generate an answer summary for the text-based question, wherein the answer summary comprises links to a starting time for a threshold number of the one or more segments in the ordered list that are ranked based on the confidence score;
    inject the text-based question into the recorded video at the one or more segments, indicated by the links, during the live stream broadcast; and
    providing provide the answer summary to the chat interface.

16. The system of claim 15, wherein to determine one or more answer segments for the question that satisfies the confidence score comprises:
  determine a time of the question in the recorded video;
  search the video data that occurs after the time of the question to identify segments with relevant word sequencing to the question;
  wherein generate the ordered list comprises candidate segments based on context analysis is further based on the relevant word sequencing in view of the question return a starting time for a threshold number of candidate segment in the ordered list.

17. The system of claim 16, wherein the context analysis comprises at least one of:
  a time proximity of the candidate segment to the time of the question;
  a time proximity of the candidate segment to a detected interaction by a presenter with the message queue;
  feedback from a viewer of the recorded video; and
  relevance of visual content of the candidate segment to the question.

18. The system of claim 15, wherein the text-based question is associated with a queue of the video data, and wherein to analyze the video data, the processor is further to:
  track an interaction of a presenter with the message queue; and
  adjust the confidence score based on the interaction.

19. A non-transitory computer readable medium, comprising instructions that when execute by a processor, the instructions to, during a live streaming broadcast that is being recorded as recorded video:
  receive, by the processor, a text-based question during the live streaming broadcast directed to a topic of the recorded video;
  analyze, by the processor, video data associated with the recorded video to determine one or more video-based answer segments for the text-based question that satisfy a confidence score based on a location of the question in the recorded video;
  generate an ordered list of the one or more video-based answer segments based on context analysis;
  during the live streaming broadcast, generate an answer summary for the text-based question, wherein the answer summary comprises links to a starting time for a threshold number of the one or more segments in the ordered list that are ranked based on the confidence score; and
  inject the text-based question into the recorded video at the one or more segments, indicated by the links, during the live stream broadcast.

20. The non-transitory computer readable medium of claim 19, wherein to determine one or more answer segments for the question that satisfies the confidence score comprises:

determine a time of the question in the recorded video;
search the video data that occurs after the time of the question to identify segments with relevant word sequencing to the question;
generate an ordered list of candidate segments based on the relevance to the question and context analysis; and
return a starting time for a threshold number of candidate segment in the ordered list.

* * * * *